US012086648B2

(12) United States Patent
Meck et al.

(10) Patent No.: US 12,086,648 B2
(45) Date of Patent: *Sep. 10, 2024

(54) SYSTEM AND METHOD FOR ACCESS MANAGEMENT FOR APPLICATIONS

(71) Applicant: Capital One Services, LLC, McLean, VA (US)

(72) Inventors: Ron Meck, Toano, VA (US); Clayton Mottley, McLean, VA (US); Abhishek Mathews, McLean, VA (US); Tianzhen Lin, Fairfax, VA (US); Stephen Sherrard, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,458

(22) Filed: Jul. 13, 2023

(65) Prior Publication Data

US 2023/0359507 A1    Nov. 9, 2023

Related U.S. Application Data

(63) Continuation of application No. 17/157,692, filed on Jan. 25, 2021, now Pat. No. 11,748,169.

(51) Int. Cl.
*G06F 9/50* (2006.01)
*G06F 9/54* (2006.01)
*G06F 11/36* (2006.01)

(52) U.S. Cl.
CPC .......... *G06F 9/5072* (2013.01); *G06F 9/505* (2013.01); *G06F 9/5077* (2013.01); *G06F 9/547* (2013.01); *G06F 11/3664* (2013.01)

(58) Field of Classification Search
CPC ...... G06F 9/5072; G06F 9/505; G06F 9/5077; G06F 9/547; G06F 11/3664; G06F 21/53; G06F 21/604; H04L 63/20; H04L 63/102
See application file for complete search history.

(56) References Cited

U.S. PATENT DOCUMENTS 10,148,701 B1   12/2018   Hecht et al.
10,348,759 B2   7/2019   Sultan et al.
(Continued)

FOREIGN PATENT DOCUMENTS

EP    3567506 A1    11/2019

OTHER PUBLICATIONS

Netflix. (Sep. 17, 2020). AWS Least Privilege for Distributed, High-Velocity Deployment [Blog post]. Retrieved from https://github.com/Netflix/repokid#readme; 8 pages.
(Continued)

*Primary Examiner* — Sisley N Kim
(74) *Attorney, Agent, or Firm* — Sterne, Kessler, Goldstein & Fox P.L.L.C.

(57) ABSTRACT

A system and method for access management for applications is disclosed. The system and method includes at least: initializing, at execution time of an application code, a scan of actions performed by the application code on resources of a cloud computing environment; identifying an existing set of permissions for the resources; identifying one or more accessed permissions by the application code based on the actions performed by the application code on the resources; generating a new set of permissions for accessing the resources based on the identifying the existing set of permissions and the one or more accessed permissions; transmitting the new set of permissions to a database for storage and later retrieval; and applying the new set of permissions to the resources when the application code is executed in a production environment.

20 Claims, 7 Drawing Sheets

(56) References Cited

U.S. PATENT DOCUMENTS

| | | | |
|---|---|---|---|
| 10,454,934 B2 | 10/2019 | Parimi et al. | |
| 10,567,228 B2 | 2/2020 | Harneja et al. | |
| 10,803,166 B1 | 10/2020 | Terkowitz et al. | |
| 11,032,287 B1* | 6/2021 | Wang | H04L 63/20 |
| 2014/0359692 A1 | 12/2014 | Chari et al. | |
| 2019/0229915 A1 | 7/2019 | Digiambattista et al. | |
| 2020/0117825 A1* | 4/2020 | Vaswani | H04L 9/3239 |
| 2020/0120142 A1* | 4/2020 | Maynard | G06Q 10/067 |
| 2022/0182333 A1 | 6/2022 | Nevrekar et al. | |
| 2022/0237046 A1 | 7/2022 | Meck et al. | |

OTHER PUBLICATIONS

Netflix. (Sep. 17, 2020). Aardvark is a multi-account AWS IAM Access Advisor API [Blog post]. Retrieved from https://github.com/Netflix-Skunkworks/aardvark; 9 pages.

International Search Report and Written Opinion of the International Searching Authority directed to related International Patent Application No. PCT/US21/065293, mailed Apr. 21, 2022; 11 pages.

* cited by examiner

SYSTEM AND METHOD FOR ACCESS MANAGEMENT FOR APPLICATIONS

CROSS-REFERENCE TO RELATED APPLICATIONS

This application is a continuation of U.S. application. Ser. No. 17/157,692, filed on Jan. 25, 2021, the contents of which is incorporated by reference herein in its entirety.

TECHNICAL FIELD

Embodiments relate to systems and methods for access management for applications, specifically access management in a cloud computing environment.

BACKGROUND

Applications built for deployment in a cloud computing environment often access many of the cloud's resources as a part of the execution of the application code. The resources allow the applications to offload some tasks typically performed by the applications to the cloud. These resources also have associated permissions. Ideally, every application deployed would be deployed with the exact and minimum permissions required for the application to perform its functions when using the resources. This practice is referred to as the principle of least privilege. In practice, however, due to the large number of applications deployed, the effort required to determine the precise permissions required for each application in a complex cloud environment does not scale. This often leads to situations where certain applications have more permissions to resources and when accessing resources than the applications need in order to perform their functions. This can result in security threats for the cloud computing environment, because it provides those wanting to attack and breach the cloud, a large window from which they may further penetrate the cloud environment if one application is breached. Thus, solutions are needed for improved methods of access management for applications deployed in a cloud computing environment.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

DETAILED DESCRIPTION

Figure 1:
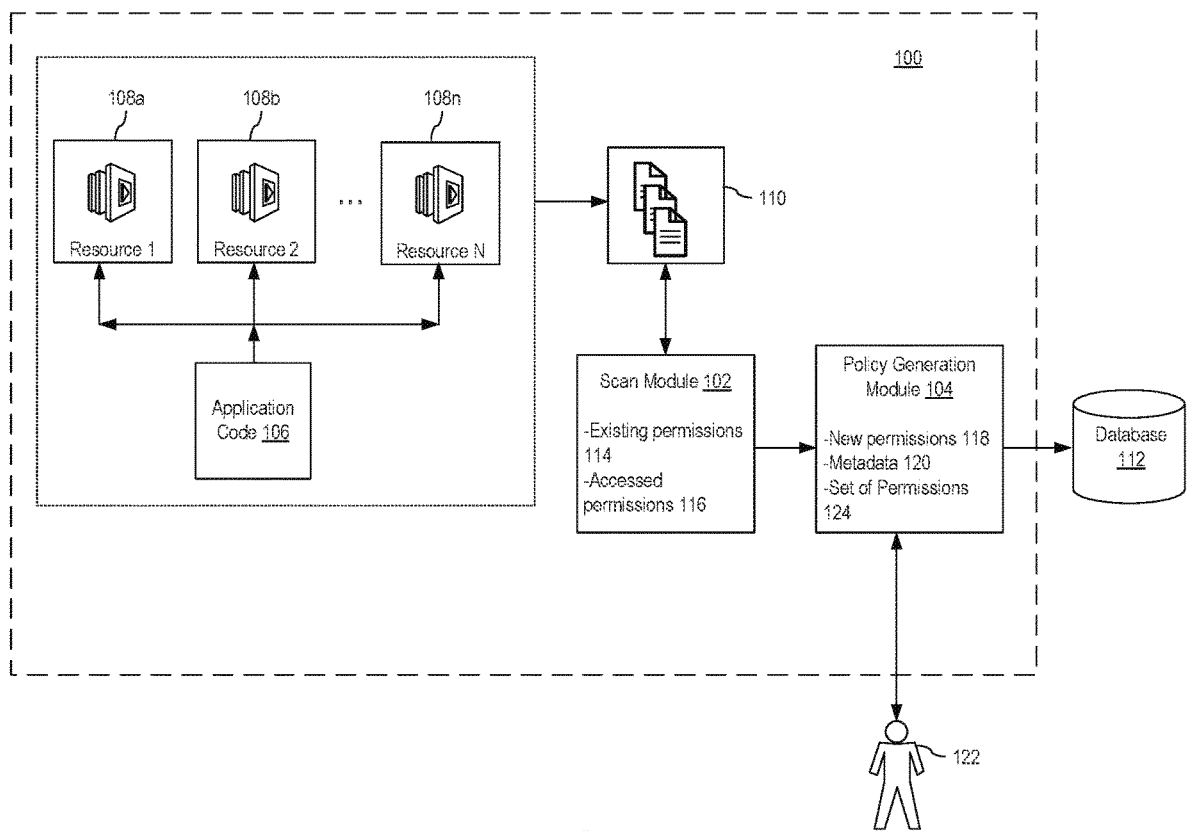
FIG. 1 is a system for access management for applications in an embodiment of the present disclosure.

Embodiments disclosed herein provide a system and method for access management for applications. The system and method includes at least initializing, by one or more computing devices and at execution time of an application code, a scan of actions performed by the application code on resources of a cloud computing environment. The system and method further includes identifying an existing set of permissions for the resources and identifying one or more accessed permissions by the application code based on the actions performed by the application code on the resources. The system and method further includes generating a new set of permissions for accessing the resources based on identifying the existing set of permissions and the one or more accessed permissions. The system and method further includes transmitting the new set of permissions to a database for storage and later retrieval and applying the new set of permissions to the resources when the application code is executed in a production environment.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, a pressure sensor, an inertial sensor, a microelectromechanical system (MEMS), passive devices, or a combination thereof. Further, if a module or unit is written in the system or apparatus claims section below, the module or unit is deemed to include hardware circuitry for the purposes and the scope of the system or apparatus claims.

The modules or units in the following description of the embodiments may be coupled to one another as described or as shown. The coupling may be direct or indirect, without or with intervening items between coupled modules or units.

The coupling may be by physical contact or by communication between modules or units.

System Overview and Function

FIG. 1 shows a system 100 for access management for applications in an embodiment of the present disclosure. In one embodiment, the system 100 may be part of a backend computing infrastructure, including a server infrastructure of a company or institution. The backend computing infrastructure may be implemented in a cloud computing environment. The cloud computing environment may be a public or private cloud service. Examples of a public cloud include Amazon Web Services (AWS), IBM Cloud, Oracle Cloud Solutions, Microsoft Azure Cloud, and Google Cloud, as examples. A private cloud refers to a cloud infrastructure similar to a public cloud with the exception that it is operated solely for a single organization.

The system 100 may be used to generate permissions for an application code 106 that restricts or grants access for the application code 106 to resources 108 of the cloud computing environment. For the purposes of discussion in this disclosure, it is assumed that the application code 106 is to be deployed in a cloud computing environment. Continuing with the example, the permissions allow or restrict the application code 106 from accessing or utilizing certain functions of the resources 108. The application code 106 refers to software code, software packages, or software executables, to be executed in the cloud computing environment. The permissions refer to rights given to the application code 106 to access the resources 108, or some functionality of the resources 108, of the cloud computing environment. The resources 108 refer to services of the cloud computing environment that the application code 106 can call or access to implement some task or function. The resources 108 allow the application code 106 to perform some function on the cloud, for example, store objects, write data to objects, or delete data to objects, etc., as examples. For example, in AWS, the resources 108 can include an Amazon EC2 instance, an AWS CloudFormation stack, or an Amazon S3 bucket and sub-components thereof, as examples. In Microsoft Azure Cloud, the resources 108 can include Azure Blob Storage and sub-components thereof, as an example. In Google Cloud, the resources 108 can include Google Cloud Storage and sub-components thereof, as an example. In FIG. 1, the resources 108 are labeled as {108a, 108b, . . . 108n}. In one embodiment, the application code 106 can access the resources 108 by making application programming interface (API) calls to the resources 108.

As previously indicated, the purpose of the system 100 is to generate permissions to give the application code 106 deployed in a cloud computing environment sufficient privileges or rights to access the resources 108 to perform the functions of the application code 106, without giving the application code 106 more privileges to the resources 108 than it needs. Thus, the system 100 automates and implements the principle of least privilege for the application code 106 by preventing the application code 106 from having more rights and access to the resources 108 than it needs to have.

In one embodiment, the system 100 may be implemented with modules and sub-modules. For example, the system 100 may include a scan module 102 and a policy generation module 104. In one embodiment, the scan module 102 can couple to the policy generation module 104.

The scan module 102 enables the initialization of a scan and the scan of actions performed by the application code 106 on resources 108 of the cloud computing environment. The scan refers to a process by which the scan module 102 identifies the actions performed by the application code 106 on, and its interactions with, the resources 108. In one embodiment, the scan may be performed at execution time of the application code 106 in the cloud computing environment (i.e., in real-time from when the application code 106 is executed). For example, the scan may be performed by parsing log files, database entries, tables, etc., that indicate what actions are performed by the application code 106 on the resources, and comparing application programming interface (API) calls made by the application code 106 to the resources 108, to known API functions to determine what actions are performed by the application code 106 on the resources 108. The scan process will be discussed further below. Real-time refers to an instance where the scan is done near instantly from when the application code 106 is executed.

In a preferred embodiment, the scan module 102 can perform its functions as a part of the testing of the application code 106, and within a test environment of the cloud. In other words, the initialization of the scan and the scan may be performed prior to the application code 106 being deployed in a production environment of the cloud. A production environment refers to a setting where the application code 106 is put into operation for its intended use by end users, rather than for testing. The purpose of performing the scan during the testing of the application code 106 is to better understand how the application code 106 interacts with the resources 108 prior to its use in production, and to generate permissions for accessing resources 108 prior to the application code 106 using the resources 108 in production. This allows for robust testing of the application code 106 prior to deployment in a production environment, and the upfront knowledge of how the application code 106 utilizes the resources 108. This knowledge further allows developers to fix or patch the application code 106 prior to the application code 106 being deployed in production, to generate and/or refine the permissions for accessing the resources 108. This ultimately saves the company or institution time and money because fixing errors to application code 106 once it is in production may be costly and disruptive to the company or institution's business or operations.

Continuing with the example, in one embodiment, the scan module 102 can implement the scan by accessing, scanning, and/or parsing a log 110 of the cloud computing environment to identify, using the log 110, API calls to the resources 108 by the application code 106 during execution. For the purposes of this disclosure, it is assumed that the log 110 is generated and updated during execution of the application code 106. The API calls indicate accessed permissions 116 by the application code 106. The accessed permissions 116 refer to functions of the resources 108 requested to be used or accessed by the application code 106.

The log 110 refers to a computer readable file, such as a .txt file, or a table, such as a database table, with entries listing the actions taken by the application code 106 in the cloud computing environment. For the purposes of this disclosure, it is assumed that the cloud computing environment generates a log 110 for all actions taken by the application code 106, and the log 110 includes step by step entries or listings of the actions performed by the application code 106 upon execution in the cloud computing environment, including what API calls the application code 106 makes, and to what resources 108 it makes the API calls. It is further assumed that the system 100, administrators of the system 100, or developers of the application code 106 have access to the log 110, and the aforementioned entries from the log 110 so that the accessed permissions 116 may be determined.

Continuing with the example, by identifying the accessed permissions 116, the scan module 102 can identify what resources 108 and what functions of the resources 108 the application code 106 wants to use or access, and the permissions the application code 106 needs in order to use or access those functions. For example, in one embodiment, if the application code 106 is attempting to store data in an Amazon S3 bucket, the scan module 102 can identify API calls associated with the storing of the data, and based on identifying the API calls or the API calls in addition to the parameters passed via the API calls to the resources 108, can determine that the application code 106 needs write access to the resources 108 to store the data. Similarly, if the application code 106 is attempting to read data from an Amazon S3 bucket, the scan module 102 can identify API calls associated with the reading of the data, and based on identifying the API calls or the API calls in addition to the parameters passed via the API calls to the resources 108, determine that the application code 106 needs read access from the resources 108. The aforementioned are merely exemplary and not meant to be limiting. Other functions may be performed, and other API calls may be identified. In one embodiment, the API calls may be identified by scanning, parsing, and/or reading the log 110 and matching known API functions or methods to those listed in the log 110. Because the API functions or methods are known, it is also known what functions they perform and therefore known what permissions are required to perform those functions.

In one embodiment, the scan module 102 can further enable identifying an existing set of permissions 114 for the resources 108. The existing set of permissions 114 refer to permissions associated with the resources 108 prior to the execution of the application code 106. The purpose of identifying the existing set of permissions 114 is to identify and determine what access the application code 106 has to the resources 108 prior to its execution. Once determined, the existing set of permissions 114 may be used as a baseline for determining what permissions need to be added or removed to the existing set of permissions 114 when generating the permissions for the application code 106, so that the application code 106 can have the least privilege needed to perform its functions. In one embodiment, the existing set of permissions 114 may be configured by an administrator of the system 100 or a developer of the application code 106. In a preferred embodiment, the resources 108 are configured, in a first instance, to give the application code 106 the maximum set of permissions and access to the resources 108. In this way, the application code 106 can have total access to the resources 108 at the outset of execution in the test environment. Subsequently, and based on at least the identified API calls by the scan module 102, permissions may be set to remove permissions or access to the resources 108 and/or their sub-components, so that a customized set of permissions may be generated for the application code 106 to implement the least privilege access for the application code 106. Throughout this application, this customized set of permissions will be referred to as a new set of permissions 118.

Referring back to the identification of the existing set of permissions 114, in one embodiment, the identification of the existing set of permissions 114 may be performed in a similar manner as discussed with respect to the identification of the accessed permissions 116, and using similar techniques. For example, in one embodiment, the identification may be performed by using the log 110, which can also store and indicate the existing set of permissions 114 of the resources 108. For example, the scan module 102 can scan, parse, and/or read the log 110 to determine the existing permissions 114 of the resources 108. For this embodiment, it is assumed that the cloud computing environment has written the permissions associated with the resources 108 in the log 110. Alternatively, the existing set of permissions 114 may be identified by separately executing a software code or script, or making a separate API call to the resources 108 requesting identification of the existing set of permissions 114 for the resources 108 so that it may be known what functions of the resources 108 may be utilized.

In one embodiment, once the existing set of permissions 114 and the accessed permissions 116 are identified, control, the existing set of permissions 114, and the accessed permissions 116 may be passed to the policy generation module 104. The policy generation module 104 enables the generation of the new set of permissions 118 based on the existing set of permissions 114 and accessed permissions 116. In one embodiment, the policy generation module 104 can generate the new set of permissions 118 by comparing the accessed permissions 116 to the existing set of permissions 114 and determining a difference between the accessed permissions 116 and the existing set of permissions 114. Based on the comparison, the policy generation module 104 can modify the existing set of permissions 114 to add or delete permissions to the existing set of permissions 114 based on the accessed permissions 116.

By way of example, if the existing set of permissions 114 indicates that the application code 106 has total access to the resources 108, but the accessed permissions 116 indicates that the application code 106 only wants to read data from the resources 108, thus only needing read permissions, the policy generation module 104 can modify the existing set of permissions 114 to only allow read permissions or calls to functions of the resources 108 allowing read functions when the application code 106 is executed. In this way, the policy generation module 104 can remove unnecessary permissions the application code 106 has to the resources 108, so as to give the application code 106 the least amount of privilege to the resources 108. In one embodiment, the modified existing set of permissions 114 may be saved as part of a permission policy of the application code 106. The modified existing set of permissions 114 and/or the permission policy thus become the new set of permissions 118.

The permission policy refers to a data structure or file indicating what access the application code 106 has to the resources 108, and may be used by the system 100 to limit the application code 106 access to the resources 108 when the application code 106 is executed in a production environment. For example, the permission policy may be used as a file that the application code 106 can call or may be read as part of a script executed on the cloud computing environment at the time of execution of the application code 106 to limit access of the application code 106 to the resources 108.

In one embodiment, the permission policy and/or the new set of permissions 118 may be stored in a database 112 for later retrieval. In one embodiment, the database 112 may be part of the system 100. In another embodiment, the database 112 may be external to the system 100.

In one embodiment, as part of generating the new set of permissions 118, the policy generation module 104 can further enable the generation of metadata 120 regarding the new set of permissions 118. The metadata 120 refers to a set of data describing and giving information about the new set of permissions 118. For example, the metadata 120 can include information regarding the time or date that the new set of permissions 118 were generated. In one embodiment, such information may be represented as a timestamp. The metadata 120 can further include other information regarding the new set of permissions 118, such as what directories or locations the new set of permissions 118 are saved to, who or what device initiated the scan module 102 to initialize the processing by which the new set of permissions 118 were generated, what permissions were added or deleted as a part of the generation of the new set of permissions 118, or a combination thereof. The aforementioned are merely exemplary and not meant to be limiting. Other information may be included as part of the metadata 120. In one embodiment, the metadata 120 may be saved on the database 112 or may be incorporated into a computer readable file, such as an extensible markup language (XML) file that may be saved on the database 112 for later retrieval.

In one embodiment, the metadata 120 may be used by the system 100, an administrator of the system 100, or a developer of the system 100 as part of an audit trail. In this way, the metadata 120 may be used to determine information regarding past permissions, including but not limited to, times and dates that those permissions were generated, and by whom they were generated. The information can further be used as part of the testing of the application code 106 and/or to identify problematic permission policies, or may be used in data breach analysis where breaches of the cloud environment via the application code 106 are discovered.

In one embodiment, the policy generation module 104, as part of generating the new set of permissions 118 can enable the receipt of a set of permissions 124 from a user 122 of the system 100. The set of permissions 124 may be additional permissions manually supplied by the user 122 to further supplement (i.e., add to or remove from) the new set of permissions 118 generated by the policy generation module 104. In one embodiment, the user 122 may be an administrator of the system 100 or a developer of the application code 106. The purpose of allowing the user 122 to supplement the new set of permissions 118 manually is to allow the system 100 the ability to receive permissions from the user 122 in instances where the policy generation module 104 fails to add or fails to remove certain permissions that are needed or are not needed by the application code 106 as part of generating the new set of permissions 118. This can occur, for example, because the information required to generate the new set of permissions 118 relies on the log 110, which is provided by the cloud computing environment itself, and if the log 110 is deficient such that it does not account for some data needed to generate the new set of permissions 118, for example does not account for an API call, the user 122 can serve as a stopgap and supply the permissions that were not accounted for.

In one embodiment, the user 122 can provide the set of permissions via a user interface 712, which may be transmitted to the system 100 via a communication path 724. The user interface 712 and the communication path 724 will be discussed further below with respect to FIG. 7.

Figure 2:
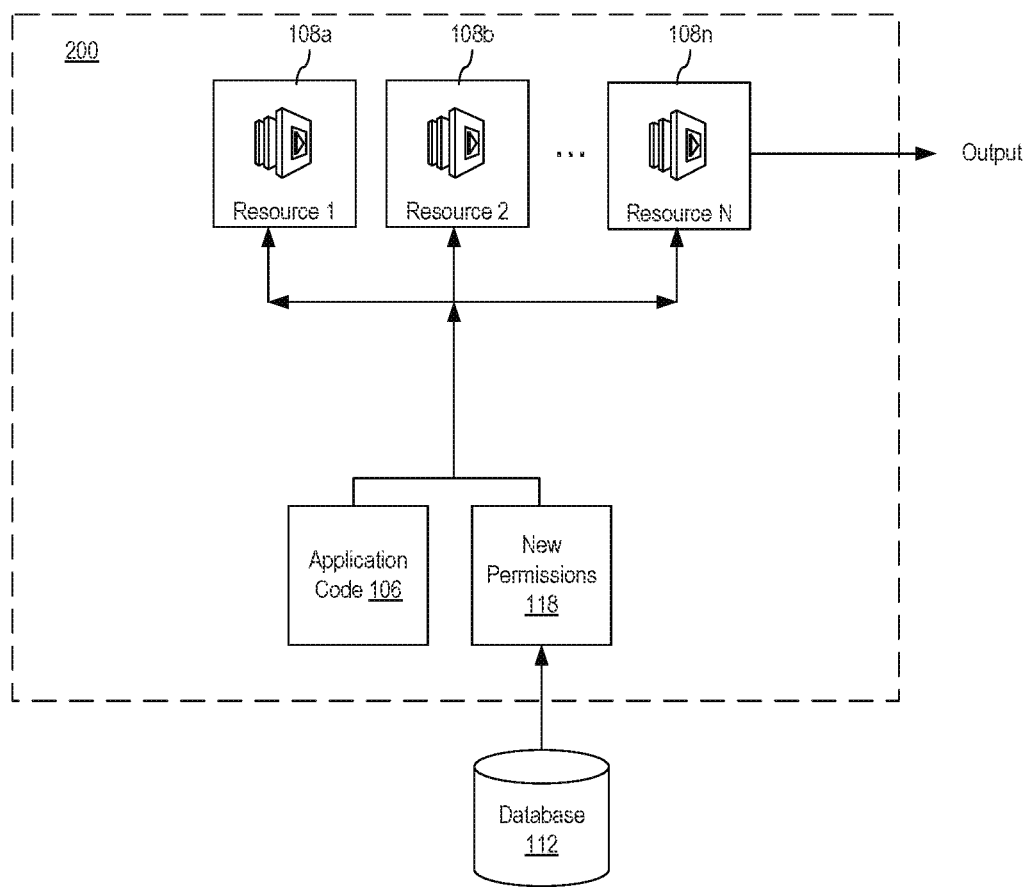
FIG. 2 is a production environment in which a new set of permissions generated by the system are applied to resources of a cloud computing environment when an application code is executed in the production environment in an embodiment of the present disclosure.

FIG. 2 shows a production environment 200 in which a new set of permissions 118 generated by the system 100 are applied to resources 108 of a cloud computing environment when an application code 106 is executed in the production environment in an embodiment of the present disclosure. As shown in FIG. 2, the application code 106 is shown as being executed in the production environment 200. The new set of permissions 118 is also shown as being applied to the resources 108 while the application code 106 is being executed. In the embodiment, shown in FIG. 2, the new set of permissions 118 is shown as being retrieved from the database 112 when the application code 106 is being executed. As discussed with respect to FIG. 1, the new set of permissions 118 will be applied to the resources 108 such that the application code 106 has the least amount of privileges it needs to perform its functions.

The modules described in FIGS. 1 and 2 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

It has been discovered that the processes and system 100 described above significantly improves the state of the art from existing systems because it implements a novel way of automating access management for applications in cloud computing environments. The improvements stem, partially, from the ability of the system 100 to generate the new set of permissions 118 prior to the application code 106 being deployed into a production environment, for example production environment 200. This ability provides significant improvements over existing systems, which provide access management for application code 106 by deploying application code 106 to production environments and then generating permissions restricting access to the resources 108. This after the fact generation of restrictions has significant drawbacks because it can cause catastrophic failures in the application code 106 deployed in production, because if certain permissions that are needed by the application code 106 are taken away while the application code 106 is deployed in production, the application code 106 can crash. The disclosed system 100 avoids this catastrophic failure in application code 106 by accounting for all the permissions needed by the application code 106 up front and prior to the application code 106 being deployed in production. If changes in the application code 106 are made, permissions may be updated for each deployment of the application code 106 and customized to the application code 106.

It has been further discovered that the system 100 improves the art by allowing for more robust testing of application code 106 because it allows for the new set of permissions 118 to be generated and tested prior to the deployment of the application code 106 into a production environment. In this way, the application code 106 may be tested and verified to work within the cloud computing environment and with the resources 108 of the cloud prior to it being deployed in production. This saves time and money in deploying application code 106 because it reduces the chances that the application code 106 will fail in a production environment and reduces the expenses required of fixing code in a production environment.

It has been further discovered that the system 100 improves the art by providing the ability for users 122, such as developers of the application code 106 to further modify or provide permissions for accessing the resources 108 by, for example, supplementing the new set of permissions 118 generated by the system 100 automatically. Existing systems lack the ability to provide users 122 to provide such inputs on top of automatically generated permissions. The ability of users 122 to provide such inputs provides an extra layer of protection that provides for the ability to generate a fuller and more robust set of permissions for accessing the resources 108 because it allows users to account for any mistakes that the system 100 makes in generating the new set of permissions 118.

Interfaces of the System

Figure 3:
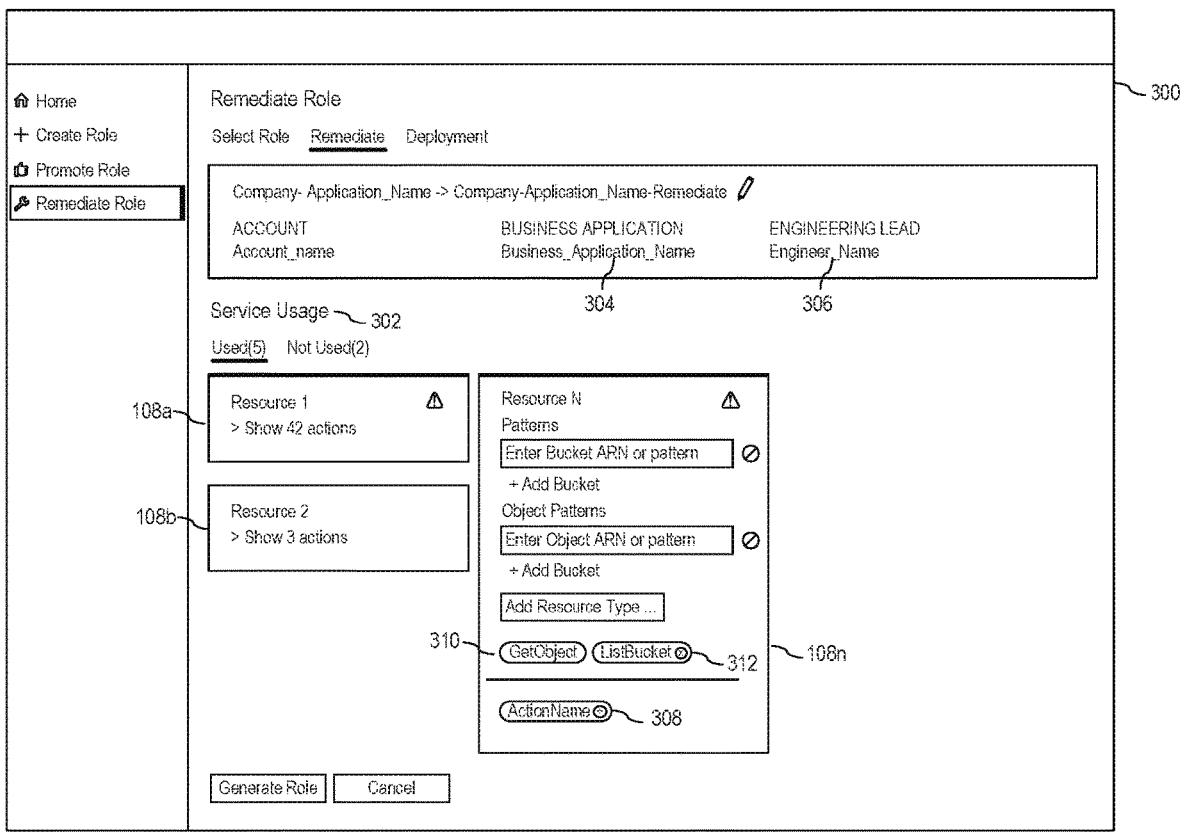
FIG. 3 is an example interface of the system used to remediate a new set of permissions generated by the system in an embodiment of the present disclosure.
Figure 4:
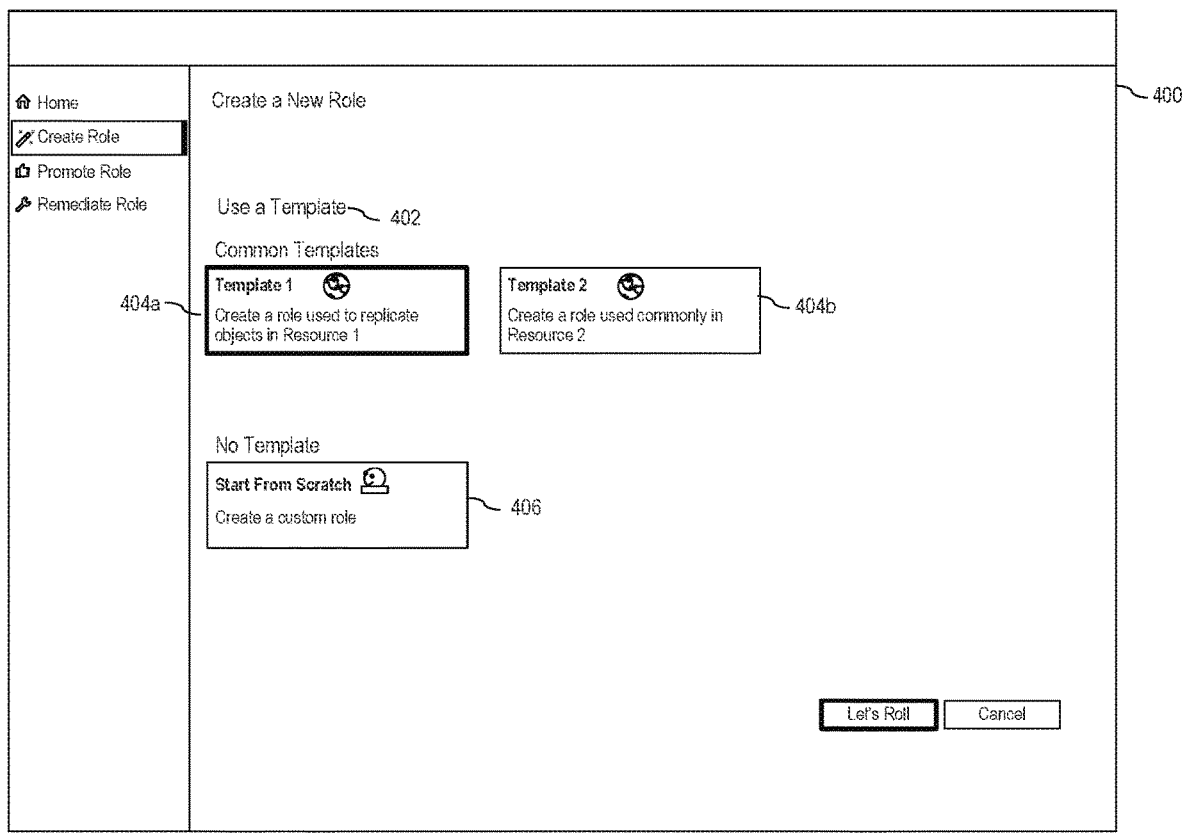
FIG. 4 is an example interface of the system used to generate an existing set of permissions for the resources in an embodiment of the present disclosure.
Figure 5:
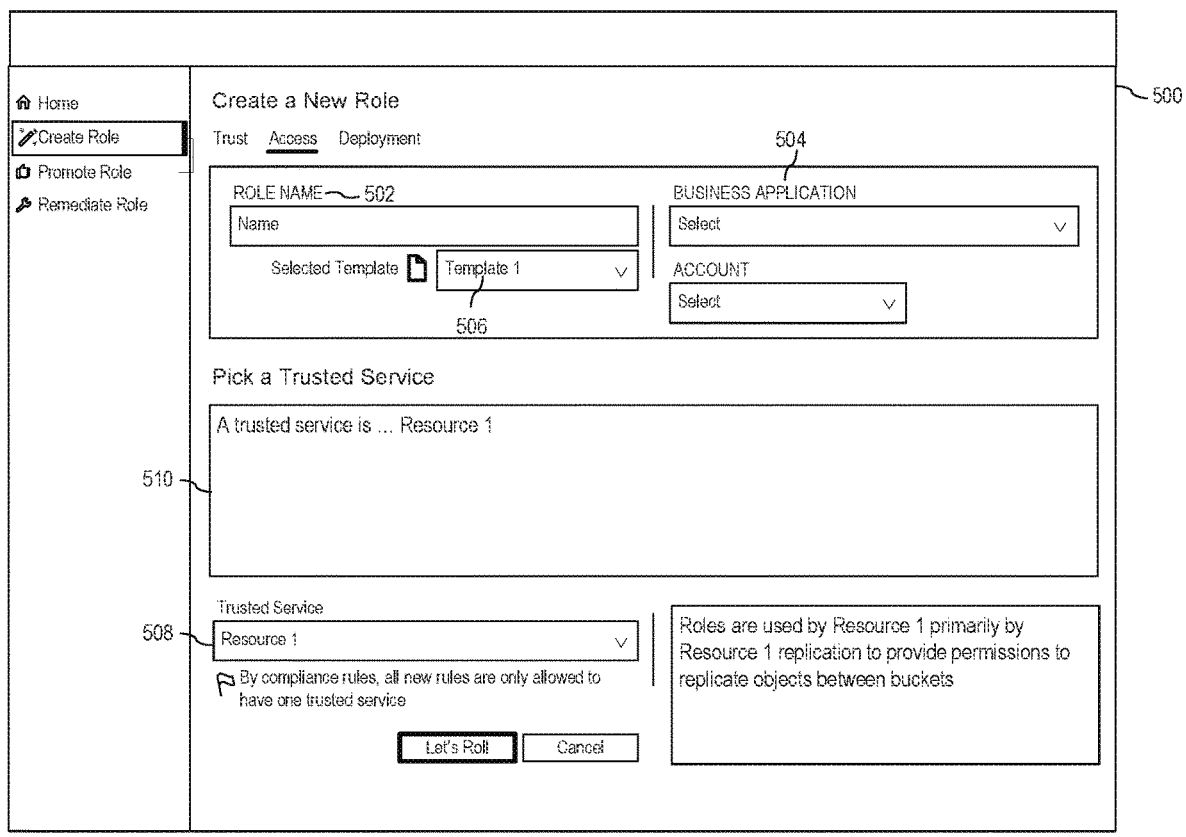
FIG. 5 is an example interface of the system used to generate the existing set of permissions for the resources when using a template in an embodiment of the present disclosure.

FIGS. 3-5 will now be discussed. FIGS. 3-5 show various interfaces of the system 100 that enable the user 122 to supplement the new set of permissions 118 manually by adding the set of permissions 124, and/or to configure the existing set of permissions 114 as discussed with respect to FIG. 1.

FIG. 3 shows an example interface 300 of the system 100 used to remediate a new set of permissions 118 generated by the system 100 in an embodiment of the present disclosure. Remediate refers to the ability to modify or change the new set of permissions 118, by for example supplying the set of permissions 124. In one embodiment, interface 300 can display information regarding an application code 106, what resources 108 it has accessed, and what the accessed permissions 116 are. For example, interface 300 indicates at least a name 304 associated with the application code 106 and a name of the engineer developing the application 306. Additionally, interface 300 can further display the accessed permissions 116 accessed by the application code 106, for example, accessed permissions 116 may be displayed under a header called "Service Usage", which is indicated as 302. In one embodiment, the accessed permissions 116 may be displayed for each resource {108*a*, 108*b*, . . . 108*n*}. In one embodiment, the user 122 can add or remove permissions from the resources 108 via the interface 300. This may be done, for example, by clicking a button or icon, which in FIG. 3 is labeled "Action Name", and which is indicated as 308, and adding or removing permissions for the application code 106 to access tasks or functions of the resources 108. The tasks can further be represented by buttons or icons. Example tasks shown in FIG. 3 include "GetObject" as indicated by 310 and "ListBucket" as indicated by 312.

FIG. 4 shows an example interface 400 of the system 100 used to generate the existing set of permissions 114 for the resources 108 in an embodiment of the present disclosure. As described with respect to FIG. 1, in one embodiment, the existing set of permissions 114 may be configured by an administrator of the system 100 or a developer of the application code 106. For the purposes of discussion with respect to FIG. 4, the user 122, as the administrator or developer, can configure the existing set of permissions 114 for the resources 108. Interface 400 shows an embodiment where the user 122 can choose amongst various options when deciding how to generate the existing set of permissions 114. In one embodiment, two options may be provided. A first option is to use an existing template of commonly used permissions for resources 108. For example, in one embodiment, different templates, as indicated as {404*a*, 404*b*} in FIG. 4, may be pre-populated with permissions commonly used for resources 108. In FIG. 4, these are listed under a header called "Use a Template", as indicated by 402. A second option allows the user 122 to generate the existing set of permissions 114 from scratch (i.e., without using a template). Generating the existing set of permissions 114 from scratch will allow the user 122 to choose any of the resources 108 the user 122 has access to, and set permissions for access of those resources 108 and/or their sub-components. This may be done, for example, by clicking a button or icon called "Start From Scratch", which is indicated as 406. Once clicked, the user 122 may be guided through a series of steps in which the user 122 can choose amongst resources 108 and set the permissions for the resources 108.

FIG. 5 shows an example interface 500 of the system 100 used to generate the existing set of permissions 114 for the resources 108 when using a template in an embodiment of the present disclosure. In interface 500, when generating the existing set of permission 114 for the resources 108, a name may be given to the instance of the existing set of permissions 114, to identify the permission set. This may be done by, for example, filling in a text box, as indicated by 502. Further, the template to be used may be chosen via a drop down menu of pre-populated templates, and/or a sub-template of a template may be chosen, as shown by 506. In one embodiment, an application code 106 may be assigned as being associated with the existing set of permissions 114. This may be done, for example, by selecting an application code 106 from a drop down menu of pre-populated application codes, as shown in 504. In one embodiment, a resource may be chosen, from amongst the resources 108, that the template is applied to. This may be done, for example, by choosing the resource from a drop down menu, as shown in 508. In one embodiment, the resource or resources 108 chosen may be displayed in box 510 so the user 122 is aware of what resources the template applies to.

Methods of Operation

Figure 6:
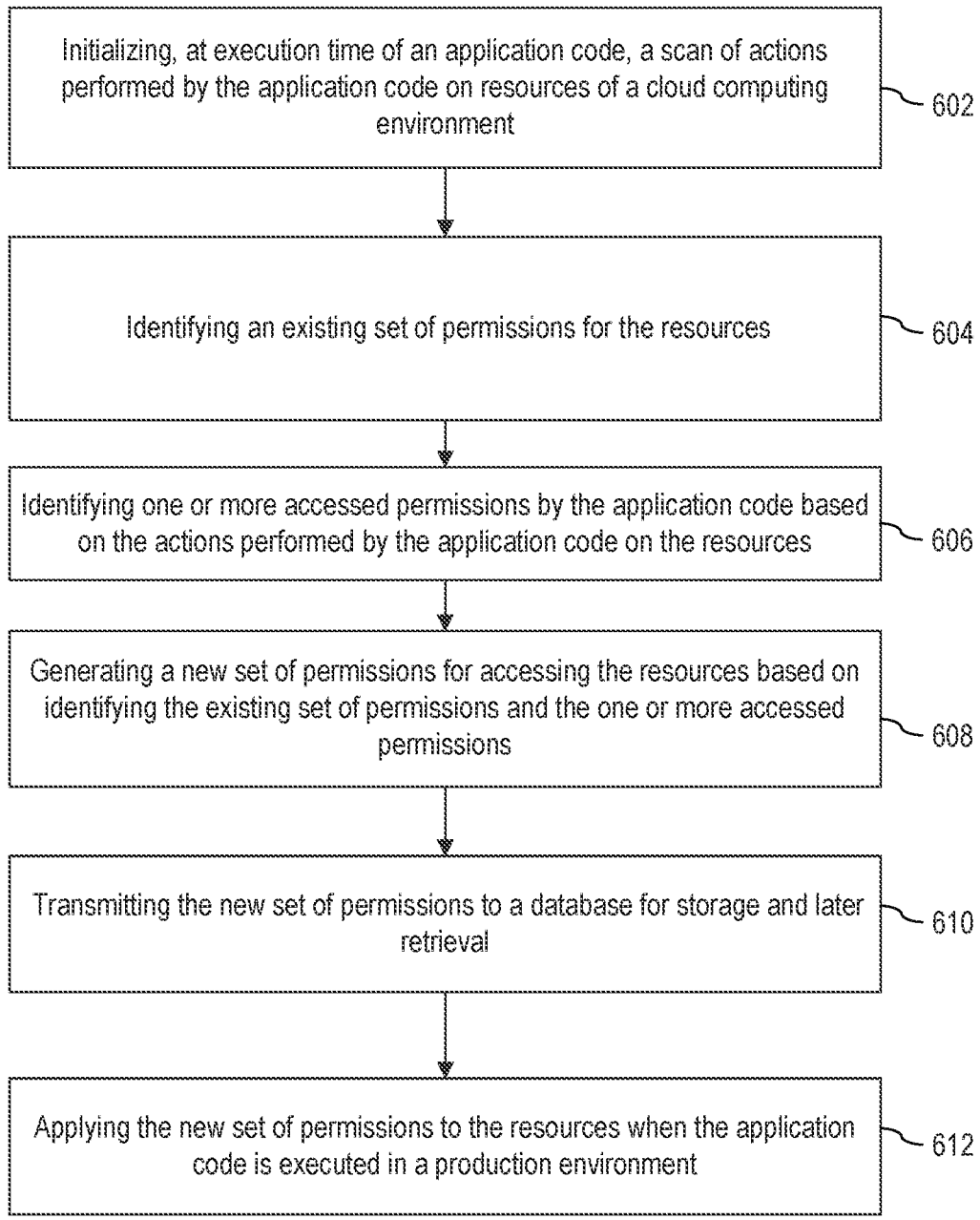
FIG. 6 is an example method of operating the system in an embodiment of the present disclosure.

FIG. 6 shows an example method 600 of operating the system 100 in an embodiment of the present disclosure. The method 600 includes initializing, by one or more computing devices and at execution time of an application code 106, a scan of actions performed by the application code 106 on resources 108 of a cloud computing environment, as shown in 602. The method 600 further includes identifying, by the one or more computing devices, an existing set of permissions 114 for the resources 108, as shown in 604. The method 600 further includes identifying, by the one or more computing devices, one or more accessed permissions 116 by the application code 106 based on the actions performed by the application code 106 on the resources 108, as shown in 606. The method 600 further includes generating a new set of permissions 118 for accessing the resources 108 based on identifying the existing set of permissions 114 and the one or more accessed permissions 116, as shown in 608. The method 600 further includes transmitting, by the one or more computing devices, the new set of permissions 118 to a database 112 for storage and later retrieval, as shown in 610. The method 600 further includes applying, by the one or more computing devices, the new set of permissions 118 to the resources 108 when the application code 106 is executed in a production environment, as shown in 612. The operations of method 600 are performed, for example, by system 100, in accordance with embodiments described above.

Components of the System

Figure 7:
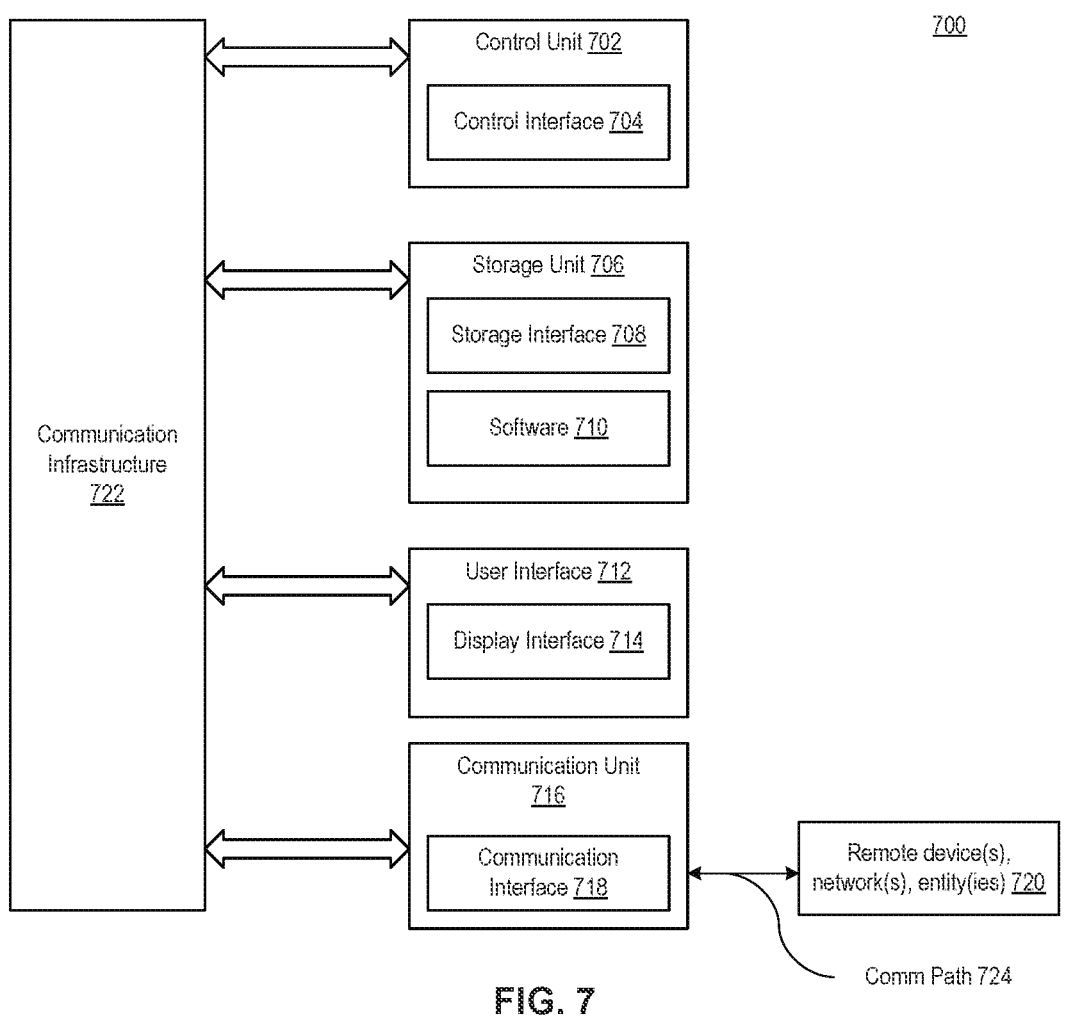
FIG. 7 is an example architecture of the components implementing the system in an embodiment of the present disclosure.

FIG. 7 is an example architecture 700 of the components implementing the system 100 in an embodiment of the present disclosure. The components indicate the hardware and software that may be used in the cloud computing environment to implement the system 100. In one embodiment, the components may include a control unit 702, a storage unit 706, a communication unit 716, and a user interface 712. The control unit 702 may include a control interface 704. The control unit 702 may execute a software 710 to provide some or all of the intelligence of the system 100. The software 710 can, for example, be a software used to initiate the scan process of the scan module 102 and the functions of the policy generation module 104. The control unit 702 may be implemented in a number of different ways. For example, the control unit 702 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 704 may be used for communication between the control unit 702 and other functional units or devices of the system 100. The control interface 704 may also be used for communication that is external to the functional units or devices of the system 100. The control interface 704 may receive information from the functional units or devices of the system 100, or from remote devices 720, or may transmit information to the functional units or devices of the system 100 or to remote devices 720. The remote devices 720 refer to units or devices external to the system 100.

The control interface 704 may be implemented in different ways and may include different implementations depending on which functional units or devices of the system 100 or remote devices 720 are being interfaced with the control unit 702. For example, the control interface 704 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 704 may be connected to a communication infrastructure 722, such as a bus, to interface with the functional units or devices of the system 100 or remote devices 720.

The storage unit 706 may store the software 710. For illustrative purposes, the storage unit 706 is shown as a single element, although it is understood that the storage unit 706 may be a distribution of storage elements. Also for illustrative purposes, the storage unit 706 is shown as a single hierarchy storage system, although it is understood that the storage unit 706 may be in a different configuration. For example, the storage unit 706 may be formed with different storage technologies forming a memory hierarchical system including different levels of caching, main memory, rotating media, or off-line storage. The storage unit 706 may be a volatile memory, a nonvolatile memory, an internal memory, an external memory, or a combination thereof. For example, the storage unit 706 may be a nonvolatile storage such as nonvolatile random access memory (NVRAM), Flash memory, disk storage, or a volatile storage such as static random access memory (SRAM) or dynamic random access memory (DRAM). The database 112 may be implemented with the same technologies as the storage unit 706.

The storage unit 706 may include a storage interface 708. The storage interface 708 may be used for communication between the storage unit 706 and other functional units or devices of the system 100. The storage interface 708 may also be used for communication that is external to the system 100. The storage interface 708 may receive information from the other functional units or devices of the system 100 or from remote devices 720, or may transmit information to the other functional units or devices of the system 100 or to remote devices 720. The storage interface 708 may include different implementations depending on which functional units or devices of the system 100 or remote devices 720 are being interfaced with the storage unit 706. The storage interface 708 may be implemented with technologies and techniques similar to the implementation of the control interface 704.

The communication unit 716 may enable communication to devices, components, modules, or units of the system 100 or to remote devices 720. For example, the communication unit 716 may permit the system 100 to communicate with the database 112, the user 122, or to transmit data to and from the various modules of the system 100. The communication unit 716 may further permit the devices of the system 100 to communicate with remote devices 720 such as an attachment, a peripheral device, the database 112, or a combination thereof through a communication path 724, such as a wireless or wired network.

The communication path 724 may span and represent a variety of networks and network topologies. For example, the communication path 724 may be part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the communication path 724. Cable, Ethernet, digital subscriber line (DSL), fiber optic lines, fiber to the home (FTTH), and plain old telephone service (POTS) are examples of wired communication that may be included in the communication path 724. Further, the communication path 724 may traverse a number of network topologies and distances. For example, the communication path 724 may include direct connection, personal area network (PAN), local area network (LAN), metropolitan area network (MAN), wide area network (WAN), or a combination thereof.

The communication unit 716 may also function as a communication hub allowing the system 100 to function as part of the communication path 724 and not be limited to be an end point or terminal unit to the communication path 724. The communication unit 716 may include active and passive components, such as microelectronics or an antenna, for interaction with the communication path 724.

The communication unit 716 may include a communication interface 718. The communication interface 718 may be used for communication between the communication unit 716 and other functional units or devices of the system 100 or to remote devices 720. The communication interface 718 may receive information from the other functional units or devices of the system 100, or from remote devices 720, or may transmit information to the other functional units or devices of the system 100 or to remote devices 720. The communication interface 718 may include different implementations depending on which functional units or devices are being interfaced with the communication unit 716. The communication interface 718 may be implemented with technologies and techniques similar to the implementation of the control interface 704.

The user interface 712 may present information generated by the system 100. In one embodiment, the user interface 712 allows a user 122 of the system 100 to interface with the devices of the system 100 or remote devices 720. The user interface 712 may include an input device and an output device. Examples of the input device of the user interface 712 may include a keypad, buttons, switches, touchpads, soft-keys, a keyboard, a mouse, or any combination thereof to provide data and communication inputs. The input device may be used by the user 122 to input the existing set of permissions 114 or set of permissions 124 from the user 122 as described with respect to FIG. 1. Examples of the output device may include a display interface 714. The control unit 702 may operate the user interface 712 to present information generated by the system 100. The control unit 702 may also execute the software 710 to present information generated by the system 100, or to control other functional units of the system 100. The display interface 714 may be any graphical user interface such as a display, a projector, a video screen, or any combination thereof and the software or interface required to display images on the graphical user interface (e.g, a web browser).

The above detailed description and embodiments of the disclosed system 100 are not intended to be exhaustive or to limit the disclosed system 100 to the precise form disclosed above. While specific examples for the system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method 600 and system 100 is cost-effective, highly versatile, and accurate, and may be implemented by adapting components for ready, efficient, and economical manufacturing, application, and utilization. Another important aspect of the embodiments of the present disclosure is that it valuably supports and services the historical trend of reducing costs, simplifying systems, and increasing performance.

These and other valuable aspects of the embodiments of the present disclosure consequently further the state of the technology to at least the next level. While the disclosed embodiments have been described as the best mode of implementing the system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer implemented method for access management for applications, the method comprising:
   (a) identifying, by one or more computing devices and at execution time of an application code, permissions for accessing resources of a cloud computing environment based on actions performed by the application code on the resources;
   (b) generating, by the one or more computing devices, a new set of permissions for accessing the resources based on:
      comparing the permissions to an existing set of permissions for the resources,
      determining a difference between the permissions and the existing set of permissions, and
      modifying the existing set of permissions to add or delete permissions to the existing set of permissions based on differences between the existing set of permissions and the permissions, wherein the modification results in generating a new set of permissions;
   (c) transmitting, by the one or more computing devices, the new set of permissions to a database for storage and later retrieval; and
   (d) applying, by the one or more computing devices, the new set of permissions to the resources when the application code is executed in a production environment.

2. The method of claim 1, further comprising generating, by the one or more computing devices, a timestamp indicating a time of generating the new set of permissions.

3. The method of claim 1, further comprising generating, by the one or more computing devices, a record of what permissions were added or deleted when generating the new set of permissions.

4. The method of claim 1, wherein the identifying in (a) is performed by identifying application programming interface (API) calls to the resources by the application code.

5. The method of claim 1, wherein (a)-(d) are performed in a test environment for the application code.

6. The method of claim 1, further comprising:
   receiving a set of permissions from a user; and
   modifying the existing set of permissions based on the received set of permissions.

7. The method of claim 6, wherein the set of permissions are received via a user interface.

8. A non-transitory computer readable medium including instructions, the instructions, when executed by one or more computing devices, perform access management for applications, the instructions comprising:
   (a) identifying, at execution time of an application code, permissions for accessing resources of a cloud computing environment based on actions performed by the application code on the resources;
   (b) generating a new set of permissions for accessing the resources based on:
      comparing the permissions to an existing set of permissions for the resources,
      determining a difference between the permissions and the existing set of permissions, and
      modifying the existing set of permissions to add or delete permissions to the existing set of permissions based on differences between the existing set of permissions and the permissions, wherein the modification results in generating the new set of permissions;
   (c) transmitting the new set of permissions to a database for storage and later retrieval; and
   (d) applying the new set of permissions to the resources when the application code is executed in a production environment.

9. The non-transitory computer readable medium of claim 8, wherein the instructions further comprise generating, by the one or more computing devices, a timestamp indicating a time of generating the new set of permissions.

10. The non-transitory computer readable medium of claim 8, wherein the instructions further comprise generating, by the one or more computing devices, a record of what permissions were added or deleted when generating the new set of permissions.

11. The non-transitory computer readable medium of claim 8, wherein the identifying in (a) is performed by identifying application programming interface (API) calls to the resources by the application code.

12. The non-transitory computer readable medium of claim 8, wherein (a)-(d) are performed in a test environment for the application code.

13. The non-transitory computer readable medium of claim 8, wherein the instructions further comprise:
   receiving a set of permissions from a user; and
   modifying the existing set of permissions based on the received set of permissions.

14. The non-transitory computer readable medium of claim 13, wherein the set of permissions are received via a user interface.

15. A computing system for access management for applications comprising:
   a memory to store instructions;
   a processor, coupled to the memory, configured to process the stored instructions to:
   (a) identify, at execution time of an application code, permissions for accessing resources of a cloud computing environment based on actions performed by the application code on the resources;
   (b) generate a new set of permissions for accessing the resources based on:
      comparing the permissions to an existing set of permissions for the resources,
      determining a difference between the permissions and the existing set of permissions, and
      modifying the existing set of permissions to add or delete permissions to the existing set of permissions based on differences between the existing set of permissions and the permissions, wherein the modification results in generating the new set of permissions;
   (c) enable transmission of the new set of permissions to a database for storage and later retrieval; and
   (d) apply the new set of permissions to the resources when the application code is executed in a production environment.

16. The computing system of claim 15, wherein the processor is further configured to generate a timestamp indicating a time of generating a new set of permissions.

17. The computing system of claim 15, wherein the processor is further configured to generate a record of what permissions were added or deleted when generating the new set of permissions.

18. The computing system of claim 15, wherein the identifying in (a) is performed by identifying application programming interface (API) calls to the resources by the application code.

19. The computing system of claim 15, wherein (a)-(d) are performed in a test environment for the application code.

20. The computing system of claim 15, wherein the processor is further configured to:
   receive a set of permissions from a user;
   modify the existing set of permissions based on the received set of permissions; and
   wherein the set of permissions are received via a user interface.

* * * * *